United States Patent
Page

(10) Patent No.: US 10,102,853 B2
(45) Date of Patent: Oct. 16, 2018

(54) MONITORING AND ACTIVATING SPEECH PROCESS IN RESPONSE TO A TRIGGER PHRASE

(71) Applicant: Cirrus Logic International Semiconductor Ltd., Edinburgh (GB)

(72) Inventor: Michael Page, Oxfordshire (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/105,755

(22) PCT Filed: Dec. 17, 2014

(86) PCT No.: PCT/GB2014/053739
§ 371 (c)(1),
(2) Date: Jun. 17, 2016

(87) PCT Pub. No.: WO2015/092401
PCT Pub. Date: Jun. 25, 2015

(65) Prior Publication Data
US 2016/0379635 A1    Dec. 29, 2016

(30) Foreign Application Priority Data
Dec. 18, 2013    (GB) .................................. 1322348.2

(51) Int. Cl.
*G10L 15/00*    (2013.01)
*G10L 15/22*    (2006.01)
*G10L 15/06*    (2013.01)
*G10L 15/08*    (2006.01)
(Continued)

(52) U.S. Cl.
CPC ............ *G10L 15/22* (2013.01); *G10L 15/063* (2013.01); *G10L 15/08* (2013.01); *G10L 15/32* (2013.01); *G10L 21/0208* (2013.01); *G10L 2015/088* (2013.01); *G10L 2015/223* (2013.01)

(58) Field of Classification Search
USPC .................................. 704/231–257, 270–275
See application file for complete search history.

(56) References Cited

U.S. PATENT DOCUMENTS 6,539,358 B1 * 3/2003 Coon .................. B60R 11/0241
704/251
8,296,142 B2 * 10/2012 Lloyd ..................... H04M 1/04
704/231

(Continued)

OTHER PUBLICATIONS

International Search Report and Written Opinion, International Application No. PCT/GB2014/053739, dated Jul. 2, 2015, 14 pages.

*Primary Examiner* — Jesse Pullias
(74) *Attorney, Agent, or Firm* — Jackson Walker L.L.P.

(57) ABSTRACT

A method of processing received data representing speech comprises monitoring the received data to detect the presence of data representing a first portion of a trigger phrase in said received data. On detection of the data representing the first portion of the trigger phrase, a control signal is sent to activate a speech processing block. The received data is monitored to detect the presence of data representing a second portion of the trigger phrase in said received data. If the control signal to activate the speech processing block has previously been sent, then, on detection of the data representing the second portion of the trigger phrase, the activation of the speech processing block is maintained.

22 Claims, 7 Drawing Sheets

(51) Int. Cl.
*G10L 15/32* (2013.01)
*G10L 21/0208* (2013.01)

(56) References Cited

U.S. PATENT DOCUMENTS

| | | |
|---|---|---|
| 8,340,975 B1 * | 12/2012 | Rosenberger ........... G10L 15/22 |
| | | 704/270 |
| 8,768,712 B1 | 7/2014 | Sharifi |
| 2005/0203740 A1 | 9/2005 | Chambers et al. |
| 2007/0026844 A1 * | 2/2007 | Watanabe ........... H04M 19/041 |
| | | 455/412.1 |
| 2007/0192109 A1 * | 8/2007 | Likens .................... G10L 15/26 |
| | | 704/275 |
| 2007/0225983 A1 * | 9/2007 | Maringo .............. G04G 9/0076 |
| | | 704/270 |
| 2011/0307253 A1 * | 12/2011 | Lloyd ..................... G10L 15/20 |
| | | 704/233 |
| 2013/0080167 A1 | 3/2013 | Mozer |
| 2013/0085755 A1 | 4/2013 | Bringert et al. |

\* cited by examiner

MONITORING AND ACTIVATING SPEECH PROCESS IN RESPONSE TO A TRIGGER PHRASE

FIELD OF DISCLOSURE

This invention relates to a method of processing received speech data, and a system for implementing such a method, and in particular to a method and system for activating speech processing.

BACKGROUND

It is known to provide automatic speech recognition (ASR) for mobile devices using remotely-located speech recognition algorithms accessed via the internet. This speech recognition can been used to recognise spoken commands, for example for browsing the internet and for controlling specific functions on or via the mobile device. In order to preserve battery life, these mobile devices spend most of their time in a power saving stand-by mode. A trigger phrase may be used to wake the main processor of the device such that speaker verification (i.e. identification of the person speaking), or any other speech analysis service, can be carried out, within the main processor or by a remote analysis service.

Requiring a physical button press before using spoken commands is, in certain circumstances, undesirable, because spoken commands are of most value in cases where tactile interaction is not practical or possible. In response to this, a mobile device may have always-on voice implemented wake-up. This feature is a limited and very low-power implementation of speech recognition that only detects that a user has spoken a pre-defined phrase. This feature runs all the time and uses sufficiently little power that the device's battery life is not significantly impaired. The user can therefore wake up the device from standby by speaking a pre-defined phrase, after which that device may indicate that it is ready to receive a spoken command for interpretation by ASR.

After the device has successfully detected the wake up phrase, it typically takes a relatively significant time, for example up to one second, for the system to wake up. For example, data may be transferred by an applications processor (AP) in the mobile device to the remote ASR service. In order to save power, the AP is kept in a low power state, and must be woken up before it is ready to capture audio for onward transmission. Because of this, either the user must learn to leave a pause between the wake up phrase and the ASR command to avoid truncation of the start of the ASR command, or a buffer must be implemented to store the audio capture whilst the AP is waking. The latter would require a relatively large amount of data memory and the former would result in a highly unnatural speech pattern which would be undesirable to users.

SUMMARY

According to a first aspect of the present invention, there is provided a method of processing received data representing speech comprising the steps of:
monitoring the received data to detect the presence of data representing a first portion of a trigger phrase in said received data;
sending, on detection of said data representing the first portion of the trigger phrase, a control signal to activate a speech processing block, and monitoring the received data to detect the presence of data representing a second portion of the trigger phrase in said received data, and
   if said control signal to activate the speech processing block has previously been sent, maintaining, on detection of said data representing the second portion of the trigger phrase, the activation of said speech processing block.

According to a second aspect of the present invention, there is provided a speech processor, comprising:
an input, for receiving data representing speech; and
a speech processing block,
wherein the speech processor is configured to perform a method according to the first aspect.

According to a third aspect of the present invention, there is provided a speech processor, comprising:
an input, for receiving data representing speech; and
an output, for connection to a speech processing block,
wherein the speech processor is configured to perform a method according to the first aspect.

According to a fourth aspect of the present invention, there is provided a mobile device, comprising a speech processor according to the second or third aspect.

According to a fifth aspect of the present invention, there is provided a computer program product, comprising computer readable code, for causing a processing device to perform a method according to the first aspect.

This provides the advantage that a speech processing block can be woken up before the trigger phrase is completed, reducing processing delays.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION

Figure 1:
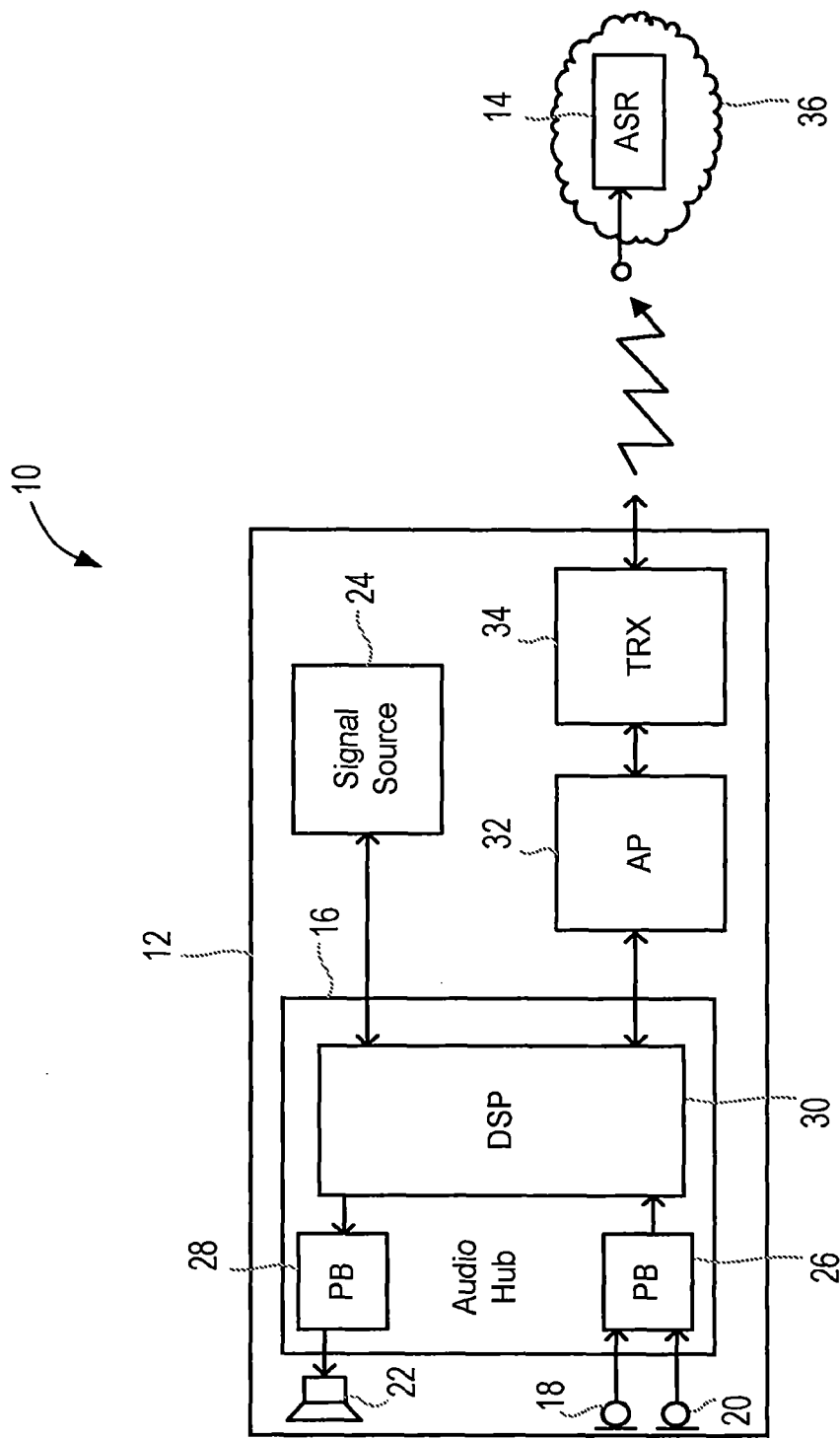
FIG. 1 is a mobile device in accordance with an aspect of the present invention.

FIG. 1 shows a system 10, including a mobile communications device 12 having a connection to a server 14. In one embodiment, the server 14 may, for example, include a speech recognition engine, but it will be appreciated that other types of speech processor may be applied in other situations. In this illustrated embodiment, the mobile device 12 is connected to a server 14 in a wide area network 36 via an air interface, although it will be appreciated that other suitable connections, wireless or wired, may be used, or that the processing otherwise carried out by the server 14 may be carried out wholly or partly within the mobile device 12, in which case the mobile device may operate in a mode in which there is no communication with a server or the mobile device may not even have a capability of communicating with a server. The mobile device 12 may be a smartphone or any other portable device having any of the functions thereof, such as a portable computer, games console, remote control terminal, or a smart watch or other wearable device or the like.

In the illustrated system, the mobile device 12 contains an audio hub integrated circuit 16. The audio hub 16 receives signals from one or more microphones 18, 20 and outputs signals through at least one speaker or audio transducer 22. In this figure there are two microphones 18, 20 although it will be appreciated that there may be only one microphone, or that there may be more microphones. The audio hub 16 also receives signals from a signal source 24, such as a memory for storing recorded sounds or a radio receiver, which provides signals when the mobile device is in a media playback mode. These signals are passed on to the audio hub 16 to be output through the speaker 22.

In the illustrated example, the audio hub 16 contains two processing blocks 26, 28 and a digital signal processor (DSP) 30. The first processing block 26 processes the analogue signals received from the microphones 18, 20, and outputs digital signals suitable for further processing in the DSP 30. The second processing block 28 processes the digital signals output by the DSP 30, and outputs signal suitable for inputting into the speaker 22.

The DSP 30 is further connected to an applications processor (AP) 32. This applications processor performs various functions in the mobile device 12, including sending signals through a wireless transceiver 34 over the wide area network 36, including to the server 14.

It will be appreciated that many other architectures are possible, in which received speech data can be processed as described below.

The intention is that a user will issue speech commands that are detected by the microphones 18, 20 and the respective speech data output by these microphones is processed by the DSP 30. This processed signal(s) may then be transmitted to the server 14 which may, for example, comprise a speech recognition engine. An output signal may be produced by the server 14, perhaps giving a response to a question asked by the user in the initial speech command. This output signal may be transmitted back to the mobile device, through the transceiver (TRX) 34, and processed by the digital signal processor 30 to be output though the speaker 22 to be heard by the user. It will be appreciated that another user interface other than the speaker may be used to output the return signal from the server 14, for example a headset or a haptic transducer or a display screen.

It will be appreciated that although in the preferred embodiment the applications processor (AP) 32 transmits the data to a remotely located server 14, in some embodiments the speech recognition processes may take place within the device 12, for example within the applications processor 32.

Figure 2:
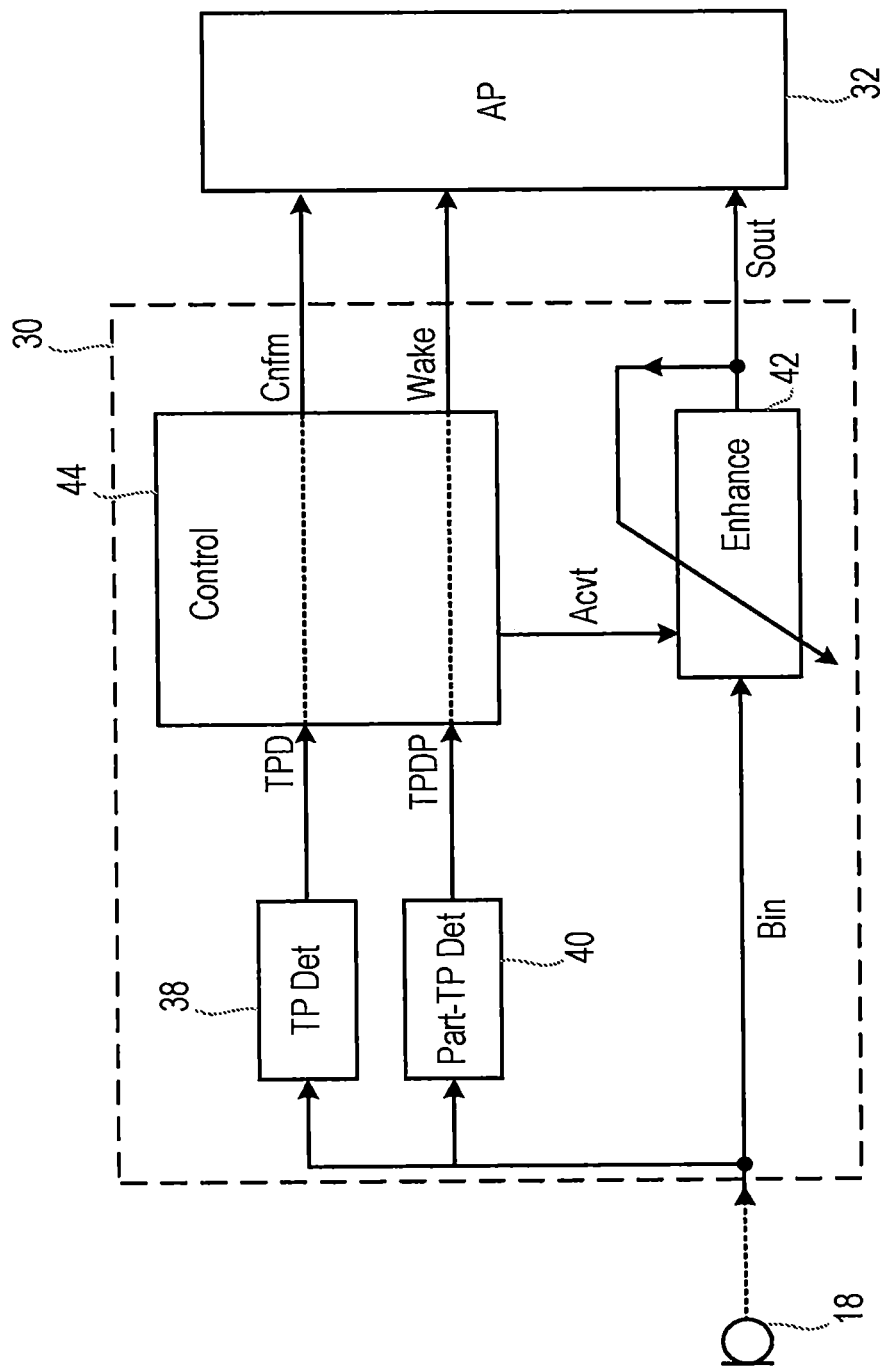
FIG. 2 shows a more detailed view of one embodiment of the digital signal processor in the mobile device of FIG. 1.

FIG. 2 shows a more detailed functional block diagram of the DSP 30. It will be appreciated that the functions described here as being performed by the DSP 30 might be carried out by hardware, software, or by a suitable combination of both.

As described in more detail below, the DSP 30 detects the presence of a trigger phrase in a user's speech. This is a predetermined phrase, the presence of which is used to initiate certain processes in the system.

Thus, a signal Bin derived from the signal generated by the microphone or microphones 18 is sent to a trigger detection block 38, and a partial trigger detection block 40 for monitoring. Alternatively, an activity detection block might be provided, such that data is sent to the trigger detection block 38, and the partial trigger detection block 40 for monitoring, only when it is determined that the input signal contains some minimal signal activity.

The signal Bin is also passed to a speech enhancement block 42. As described in more detail below, the speech enhancement block 42 may be maintained in an inactive low-power state, until such time as it is activated by a signal from a control block 44.

The trigger detection block 38 determines whether the received signal contains data representing the spoken trigger phrase, while the partial trigger detection block 40 detects whether or not the received signal contains data representing a predetermined selected part of the spoken trigger phrase, i.e. a partial trigger phrase. For example, the selected part of the trigger phrase will typically be the first part of the trigger phrase that is detected by the trigger detection block 38.

As illustrated here, the trigger detection block 38 and the partial trigger detection block 40 monitor the received data in parallel. However, it is also possible for the trigger detection block 38 to detect only the second part of the trigger phrase, and to receive a signal from the partial trigger detection block 40 when that block 40 has detected the first part of the trigger phrase, so that the trigger detection block 38 can determine when the received signal contains data representing the whole spoken trigger phrase.

On detection of the partial trigger phrase, the partial trigger detection block 40 sends an output signal TPDP to the control block 44. On detection of the spoken trigger phrase, the trigger detection block 38 sends an output signal TPD to the control block 44.

As mentioned above, input data Bin is passed to a speech enhancement block 42, which may be maintained in a powered down state, until such time as it is activated by a signal Acvt from the control block 44.

The speech enhancement block 42 may for example perform speech enhancement functions such as multi-microphone beamforming, spectral noise reduction, ambient noise reduction, or similar functionality, and may indeed perform multiple speech enhancement functions. The operation of the illustrated system is particularly advantageous when the speech enhancement block 42 performs at least one function that is adapted in response to the ambient acoustic environment.

For example, in the case of a multi-microphone beamforming speech enhancement function, the enhancement takes the form of setting various parameters that are applied to the received signal Bout, in order to generate an enhanced output signal Sout. These parameters may define relative gains and delays to be applied to signals from one or more microphones in one or more frequency bands before or after combination to provide the enhanced output signal. The required values of these parameters will depend on the position of the person speaking in relation to the positions of the microphones, and so they can only be determined once the user starts speaking.

Enhanced data Sout generated by the speech enhancement block 42 is passed for further processing. For example, in the embodiment illustrated in FIG. 2, the enhanced data generated by the speech enhancement block is passed to the applications processor 32, which might for example perform an automatic speech recognition (ASR) process, or which might pass the enhanced data to an ASR process located remotely. In other embodiments, the speech enhancement block 42 may be located in the applications processor 32.

The method described herein is also applicable in embodiments in which there is no speech enhancement block 42, and the data Bin can be supplied to the applications processor 32, or to another device, in response to a determination that the received data contains data representing the trigger phrase.

As described in more detail below, the partial trigger detection block 40 generates an output signal TPDP in response to a determination that the received data contains data representing the partial trigger phrase. In response thereto, the control block 44 takes certain action. For example, the control block 44 may send a signal to the applications processor 32 to activate it, that is to wake it up so that it is able to receive the (possibly enhanced) speech data. As another example, the control block 44 may send a signal to the enhancement processing block 42 to activate it, that is to wake it up so that it is able to start adapting its parameters.

The trigger detection block 38 generates an output signal TPD in response to a determination that the received data contains data representing the trigger phrase. In response thereto, the control block 44 takes certain action to maintain the previous activation. For example, the control block 44 may send a signal (Cnfm) to the applications processor 32 to confirm the previous activation. As another example, after receiving the signal TPDP from the partial trigger detection block 40, the control block 44 may monitor for the receipt of the signal TPD from the trigger detection block 38 within a predetermined time period. If that is not received, the control block 44 may send a deactivation signal (not illustrated) to the enhancement processing block 42 to deactivate it. If, by contrast, the signal TPD from the trigger detection block 38 is received, the deactivation signal is not sent, and the absence of the deactivation signal can be interpreted by the enhancement processing block 42 as confirmation of the activation signal sent previously.

Figure 3:
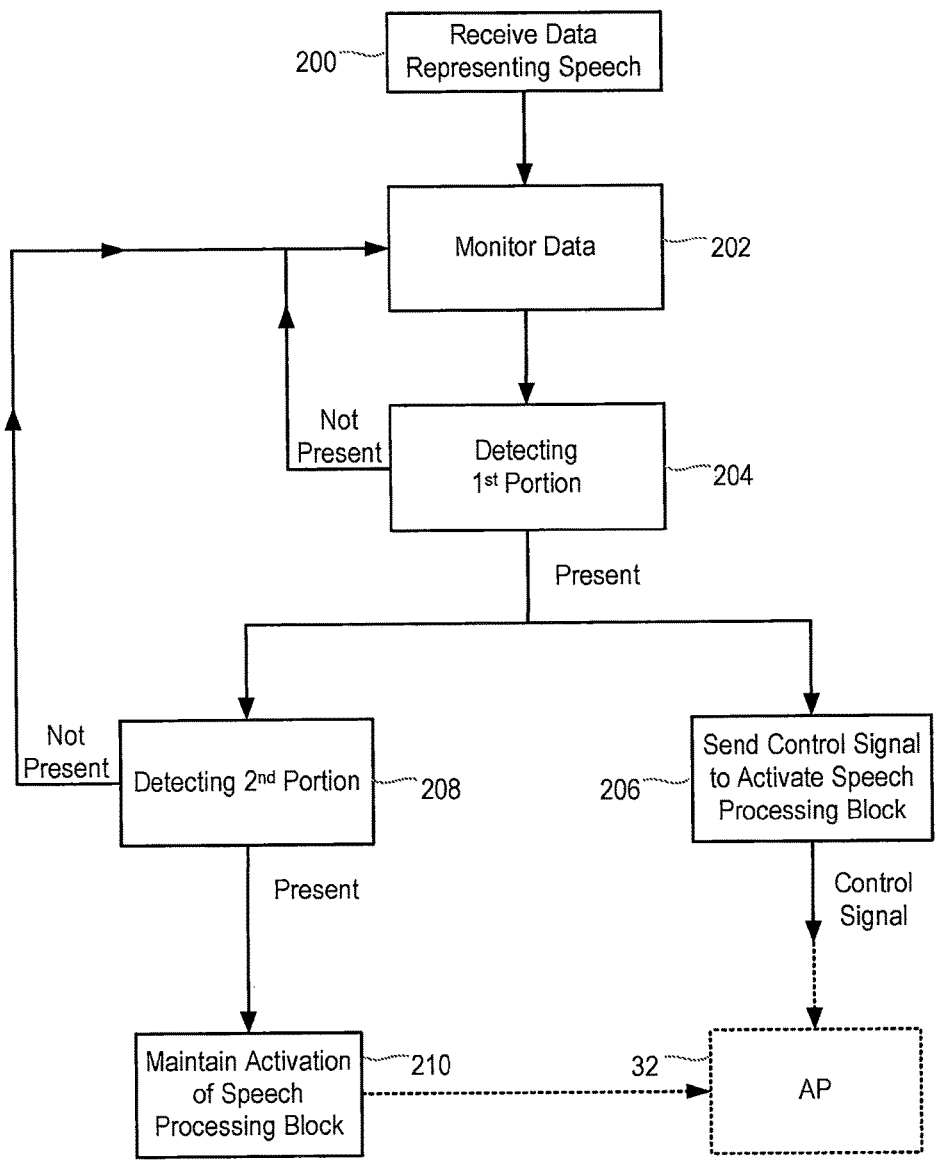
FIG. 3 is a flow chart showing an example of the operation of the system in FIG. 2.

FIG. 3 is a flow chart showing an example of the operation of the system in FIG. 2. In step 200 the speech data is received by the trigger detection block 38 and the partial trigger detection block 40. In step 202 the received data is monitored. In step 204, if data representing the first portion of the trigger phrase is present then, in step 206, the control block 44 activates at least one speech processing block by sending a control signal. If data representing the first portion of the trigger phrase is not present in step 204 then the process returns to step 202.

In step 208, if it has been found that data representing the first portion of the trigger phrase is present, and if data representing the second portion of the trigger phrase is also present, then the control block 44 maintains the activation of the speech processing block in step 210. If the second portion of the trigger phrase is not present in step 208, then the process returns to step 202.

In this process monitoring of the received data and the detection of data representing the first portion of the trigger phrase is carried out by the partial trigger detection block 40, and the detection of data representing the second portion of the trigger phrase is carried out by the trigger detection block 38.

In one embodiment the monitoring of the data by the partial trigger detection block 40 and the trigger detection block 38 is carried out in parallel. In another embodiment the trigger detection block 38 only starts monitoring the received data when the partial trigger detection block 40 has already detected the first portion of the trigger phrase.

As mentioned above, the action to maintain the activation of the speech processing block may be a positive step to send a confirmation signal, or it may simply involve not sending a deactivation signal that would be sent if the whole trigger phrase were not detected.

Figure 4:
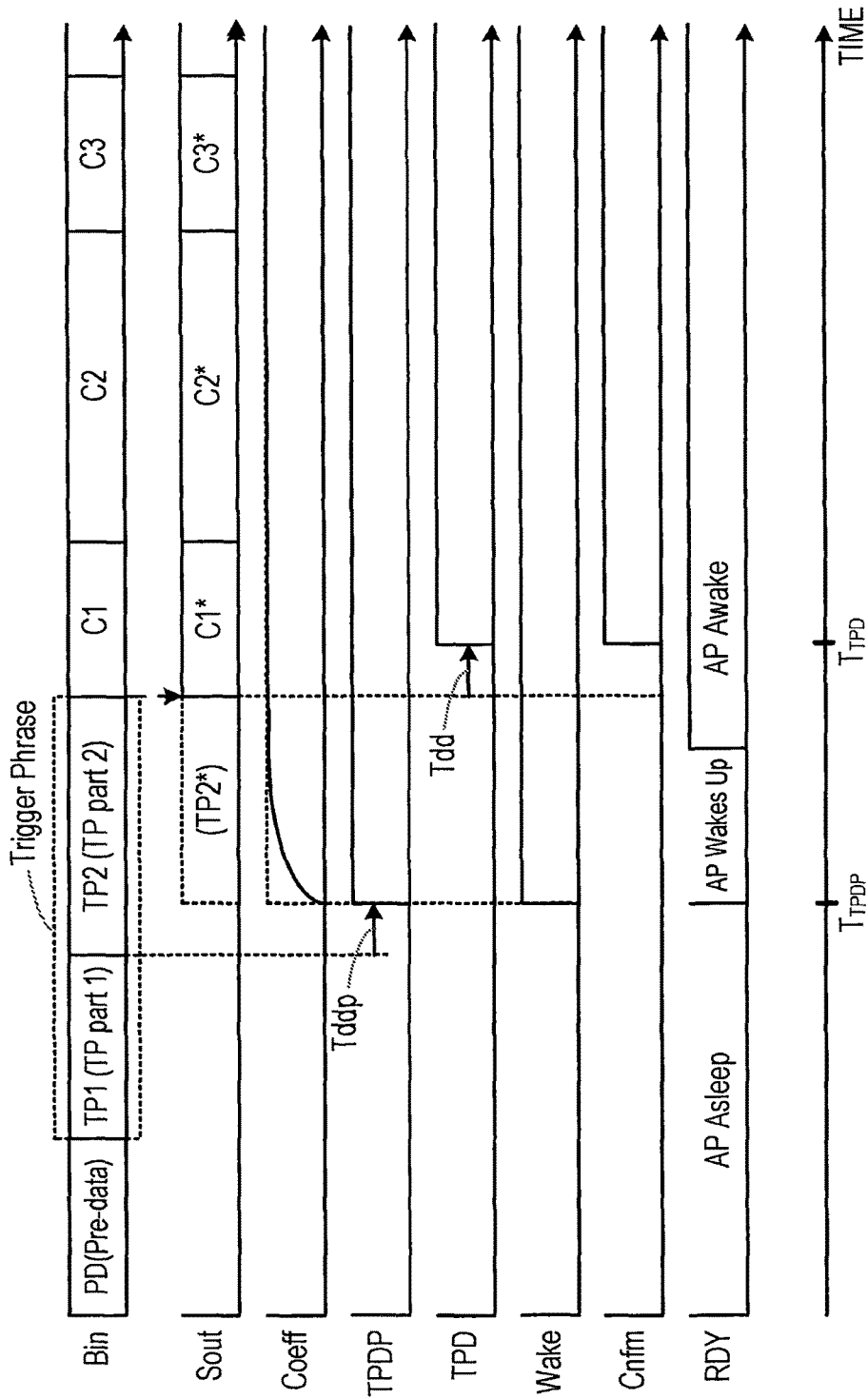
FIG. 4 shows a further example of the operation of the system in FIG. 2.

FIG. 4 shows an example of the operation of the system in FIG. 2. The axis labelled Bin shows the data input from the microphone 18. Over the course of the time depicted in FIG. 4, the input signal contains Pre-data (PD) which is representative of the signal before the user starts speaking, trigger phrase data sections TP1 and TP2 and command word data sections C1, C2 and C3. In this embodiment TP1 is representative of the first portion of the trigger phrase and either TP2 or TP1 and TP2 together represent the second portion of the trigger phrase.

Upon the detection of the first portion of the trigger phrase the partial trigger detection block 40 sends a signal TPDP to the control block 44 to signal that data representing the first portion of the trigger phrase has been detected. However, due to processing delays, this command is actually sent a time Tddp after the user has finished speaking the first portion of the trigger phrase at a time $T_{TPDP}$. This command initiates a number of responses from the control block 44.

Firstly, the control block 44 sends a command Wake to the application processor 32 to start the wake up process in the application processor 32. A command may also be sent to the enhancement block 42 to begin adaptation of its coefficients to the acoustic environment for use in processing the signal, and to start outputting to the application processor 32 the data, Sout, that has been processed using these adapting coefficients.

The line Coeff in FIG. 4 shows that, at the time $T_{TPDP}$, the coefficients or operating parameters of the enhancement processing block 42 are poorly adapted to the acoustic environment, but that they become better adapted over time, with the adapted state being represented in FIG. 4 by the line reaching its asymptote.

When data representing the second portion of the trigger phrase is detected, the trigger detection block 38 sends a signal, TDP, to the control block 44. However, again due to processing delays, this signal is actually sent at a time $T_{TPD}$, which is a time Tdd after the user has finished speaking the second portion of the trigger phrase. When the control block 44 receives this signal, it sends a confirmation signal (Cnfm) to the application processor 32. In other embodiments, no confirmation signal is sent and the application processor is allowed to continue operating uninterrupted.

By this point, the coefficients in the enhancement block have had time to converge to the desired coefficients for use in the acoustic environment. Hence the output, Sout, of the enhancement block contains the processed data C1*, C2* and C3*, which is processed effectively for use in a speech recognition engine or similar processor. At the time $T_{TPD}$, the application processor 32 has received confirmation that the second portion of the trigger phrase has been spoken and so, in one embodiment, will transmit the processed data on to the server 14.

It will be appreciated that, although in this embodiment the data output to the processor 14 is processed for use in speech recognition, there may be no such enhancement block 38 and the data output by the application processor 32 may not have undergone any processing, or any enhancement for use in speech recognition.

It will also be appreciated that, although in the preferred embodiment the application processor 32 transmits the data to a remotely located server for speech recognition processing 14, in some embodiments the speech recognition processes may take place within the device 12, or within the applications processor 32.

Thus, by activating the applications processor 32 when the first portion of the trigger phrase has been detected, the applications processor 32 can be fully awake (as shown by the line RDY in FIG. 4) by the time that the whole trigger phrase has been detected, and therefore the applications processor 32 can be ready to take the desired action when the data representing the command phrase is received, whether that action involves performing a speech recognition process, forwarding the data for processing remotely, or performing some other action. The AP may start reading data immediately on wake-up to avoid possibly missing reading C1* data during Tdd, and even start transmitting this data, leaving it to downstream processing to discard any data prior to the start of C1*.

To aid the downstream decision about when to start treating data received downstream as command words rather than residual trigger data, a sync pulse may be sent synchronous with the Cnfm edge. On receipt, the downstream processor would then know that the enhanced command phrase C1* occurred a time Tdd previously.

The delay Tdd may be known from the design of the implementation and thus pre-known by the downstream processor. However, in some embodiments delay Tdd may be data-dependent, for instance it may depend on where TP2 happens to fall in some fixed-length repetitive analysis window of the input data. In such a case, the trigger phrase detector may be able to derive a data word representing the relative timing of the end of TP2 and say a pulse on Cnfm and to transmit this to the AP, perhaps via an independent control channel or data bus.

In most cases, however, the relative latency of the channel down which Cnfm or a dependent sync pulse is sent may differ from the latency of the data channel down which the enhanced speech data is transmitted. It is thus preferable to send a sync signal down a channel with matched latency, for example a second, synchronised, speech channel, often available. To conveniently send this down a speech channel, this sync signal may take the form of a tone burst.

In addition, by activating the enhancement processing block when the first portion of the trigger phrase has been detected, the process of adapting the parameters of the enhancement processing block can be fully or substantially completed by the time that the data representing the whole trigger phrase has been detected, and therefore the enhancement processing block 42 can be ready to perform speech enhancement on the data representing the command phrase, without artefacts caused by large changes in the parameters.

Figure 5:
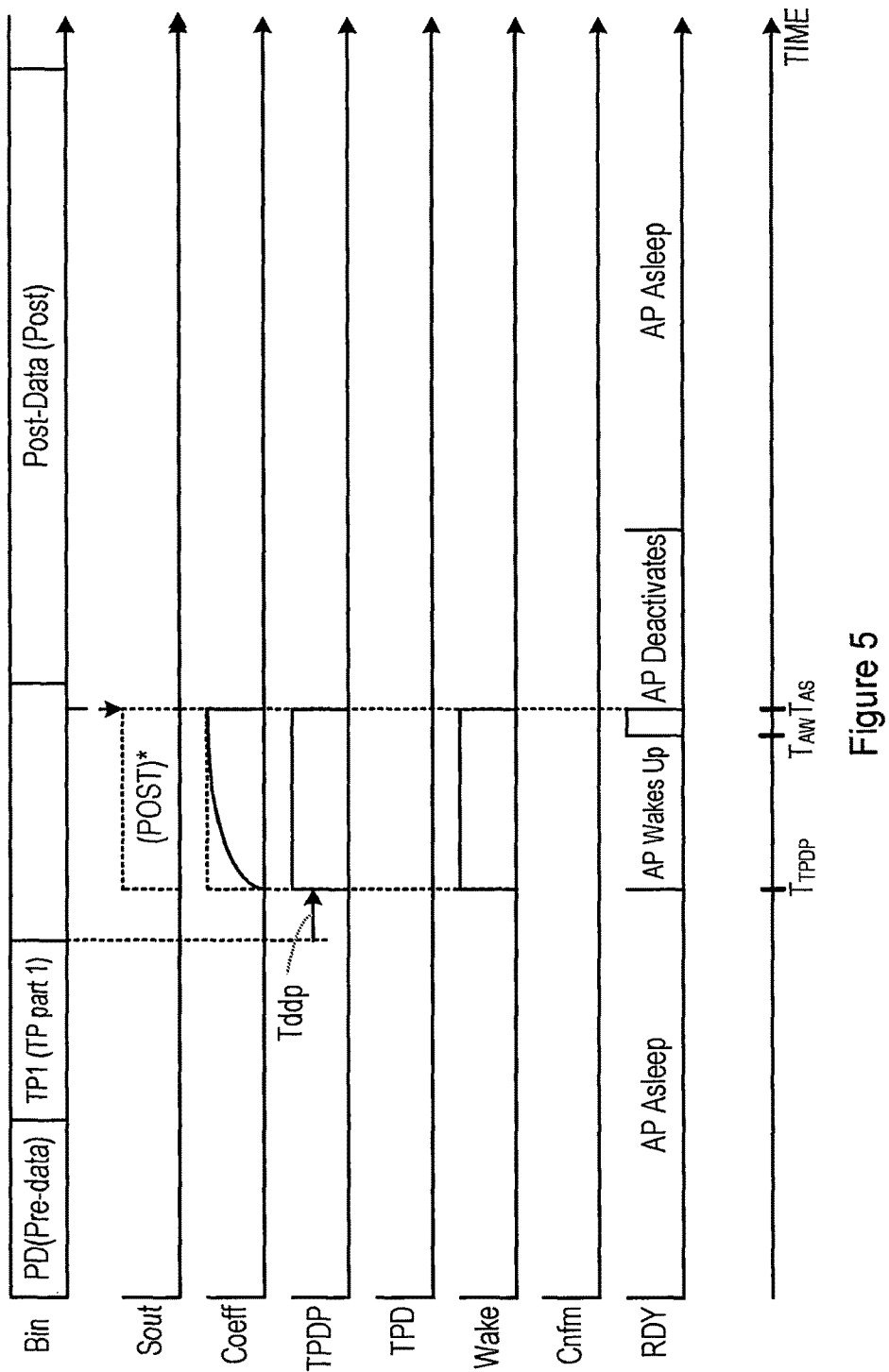
FIG. 5 shows a further example of the operation of the system in FIG. 2.

FIG. 5 shows a further example of the operation of the system in FIG. 2 in this case illustrating the situation in which only the first portion of the trigger phrase is received and detected. The axis labelled Bin shows the data input from the microphone 18. Over the course of the time depicted in FIG. 5, the input signal contains Pre-data (PD) which is representative of the signal before the user starts speaking the first portion of the trigger phrase, trigger phrase data TP1, representing the first portion of the trigger phrase, and Post-data (Post) representative of data which may or may not represent speech, but which is not recognised as representing either portion of the trigger phrase.

Upon the detection of the first portion of the trigger phrase the partial trigger detection block 40 sends a signal TPDP to the control block 44 to signal that data representing the first portion of the trigger phrase has been detected. However, due to processing delays, this command is actually sent a time Tddp after the user has finished speaking the first portion of the trigger phrase at time $T_{TPD}$. As described with reference to FIG. 4, this command initiates a number of responses from the control block 44.

Firstly, the control block 44 sends a wake command to the application processor 32. This starts the wake up process in the application processor 32. A command may also be sent to the enhancement block 42 to begin the adaptation of its coefficients to the acoustic environment for use in processing the signal, and to start outputting to the application processor 32 the data, Sout, processed using these adapting coefficients.

In this example, at time $T_{Aw}$ the application processor 32 is fully awake and ready to send data on to the processor 14. However, at time $T_{As}$ the control block 44 recognises that it has not received the TPD signal from the trigger detection block 38 within a predetermined time after receiving the TPDP signal. The control block 44 responds to this by sending a sleep command to the application processor 32, which then deactivates. The control block 44 may also send a command to the enhancement block 42 to pause the adaption of its coefficients and to cease outputting data to the application processor 32. Alternatively, rather than the control block 44 sending a deactivation command, the application processor 32 and/or the enhancement block 42 may deactivate if they do not receive a confirmation signal from the control block 44 within a predetermined time.

In some embodiments the trigger phrase detector 38 may be able to deduce that the received data does not contain the full trigger word before this timeout has elapsed and there may be a signal path (not illustrated) by which the trigger phrase detector 38 may communicate this to the control block 44 which may then immediately de-activate the enhancement processing.

Confirmation of the reception of the full trigger phrase may also be used to power up other parts of the circuitry or device, for instance to activate other processor cores or enable a display screen. Also in some embodiments a local processor, for example the applications processor, may be used to perform some of the ASR functionality, so signal TPD may be used to activate associated parts of the processor or to load appropriate software onto it.

Thus, in this situation, activating the applications processor 32 and the enhancement processing block 42 when the first portion of the trigger phrase was detected caused a small unnecessary amount of power to be consumed in waking up these blocks. However, since they were active for perhaps only a second or two, this is not a major disadvantage.

It was mentioned above that, by activating the applications processor 32 and activating the enhancement processing block 42 when the first portion of the trigger phrase has been detected, the processes of waking up the application processor and adapting the parameters of the enhancement processing block can be fully or substantially completed by the time that the data representing the whole trigger phrase has been received. However, in situations where the second portion of the trigger phrase is of shorter duration than the time required for waking up the application processor or adapting the parameters of the enhancement processing block, these steps may not be complete when the data representing the command phrase is received, and so the processing of this data may be less than optimal.

Figure 6:
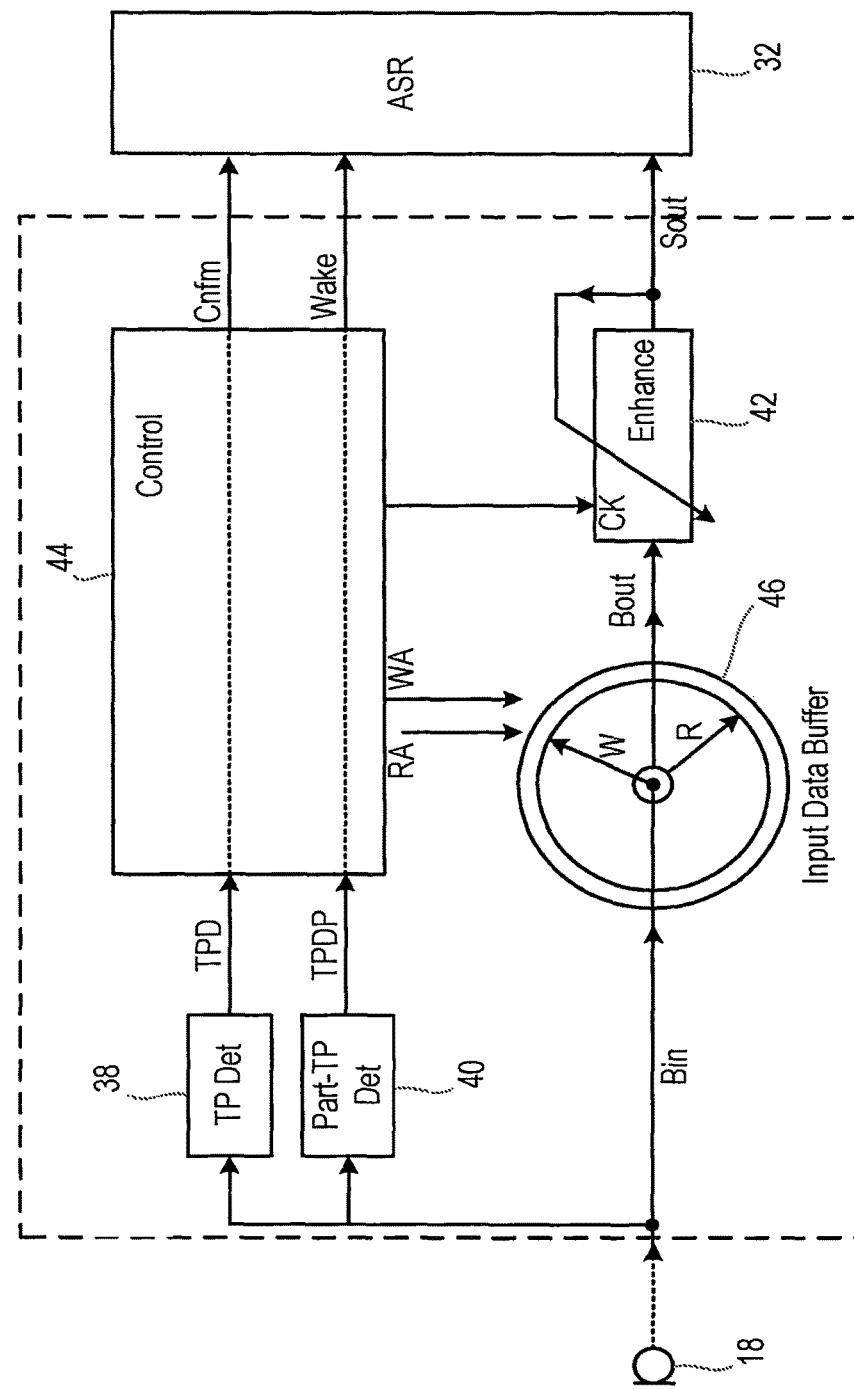
FIG. 6 shows a further example of the operation of the system in FIG. 2.

FIG. 6 shows an example of a system for dealing with this. The system shown in FIG. 6 is generally the same as the system shown in FIG. 2, and elements thereof that are the same are indicated by the same reference numerals, and will not be described further herein.

In this case, the data Bin derived from the signal from the microphone 18 is sent to the trigger detection block 38, and a partial trigger detection block 40, and is sent to a circular buffer 46 that is connected to the enhancement block 42. Data is written to the buffer 46 at a location determined by a write pointer W, and output data Bout is read from the buffer 46 at a location determined by a read pointer R. The locations indicated by the pointers W, R can be controlled by the control block 44 for example by Read Address data RA and Write Address data WA as illustrated.

Figure 7:
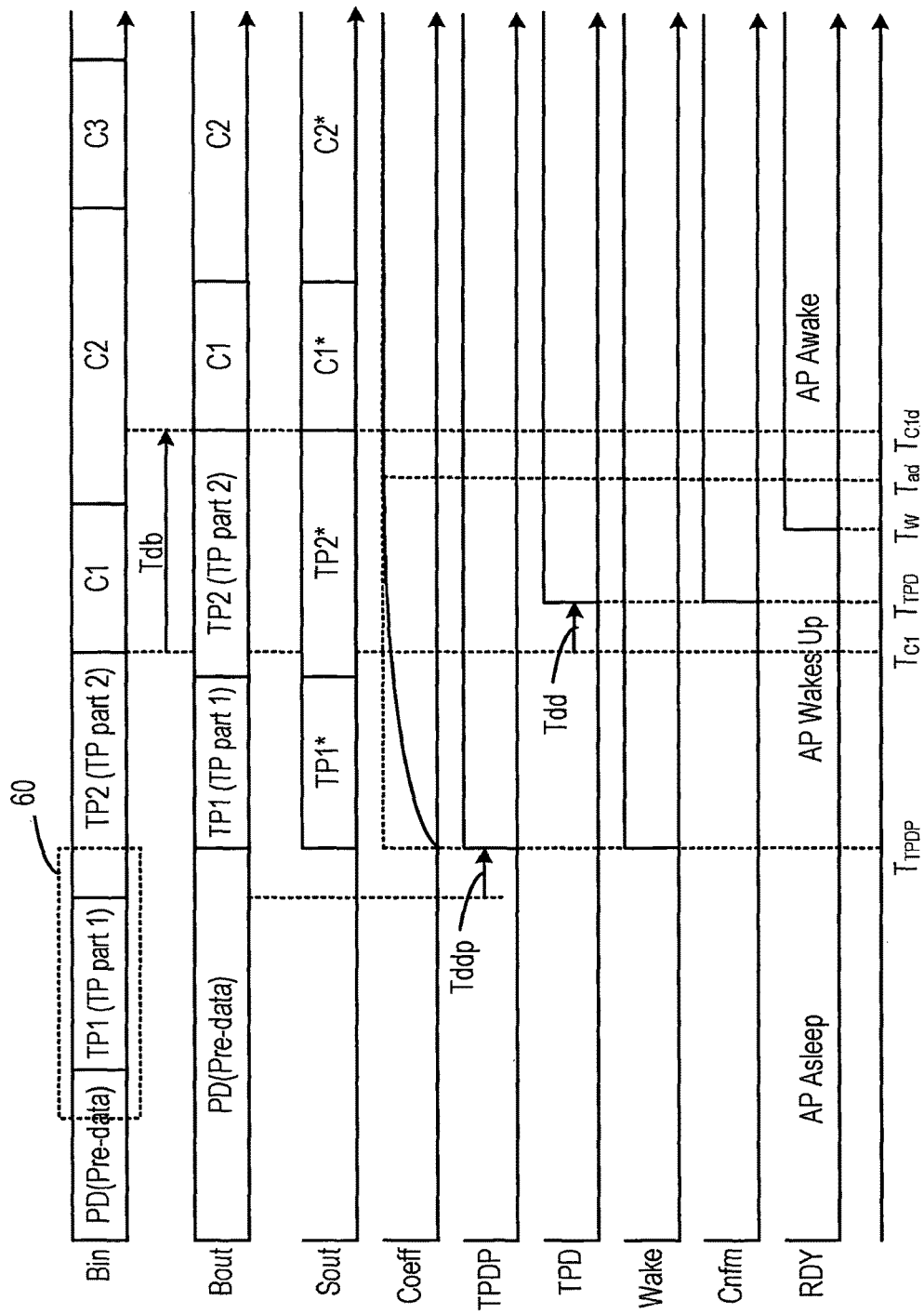
FIG. 7 shows an alternative embodiment of the digital signal processor.

FIG. 7 shows an example of the operation of the system in FIG. 6. The axis labelled Bin shows the data input from the microphone 18. Over the course of the time depicted in FIG. 7, the input signal contains Pre-data (PD) which is representative of the signal before the user starts speaking, trigger phrase data sections TP1 and TP2 and command word data sections C1, C2 and C3. In this embodiment TP1 is representative of the first portion of the trigger phrase and either TP2 or TP1 and TP2 together represent the second portion of the trigger phrase.

Upon the detection of the first portion of the trigger phrase, the partial trigger detection block 40 sends a signal TPDP to the control block 44 to signal that data representing the first portion of the trigger phrase has been detected. However, due to processing delays, this command is actually sent a time Tddp after the user has finished speaking the first portion of the trigger phrase at a time $T_{TPDP}$. This command initiates a number of responses from the control block 44.

Firstly, the control block 44 sends a command Wake to the application processor 32 to start the wake up process in the application processor 32.

Also, the control block 44 sends a command to the buffer 46 to start reading out data that was stored in the buffer at an earlier time. In the example shown in FIG. 7, the read pointer R is set so that it reads out the data at the start of the block 60 shown in FIG. 7. The data that is read out of the buffer 46 is sent to the enhancement block 42, and a command may also be sent to the enhancement block 42 to begin adaptation of its coefficients to the acoustic environment for use in processing the signal. The enhancement processor also starts outputting to the application processor 32 the data, Sout, that has been processed using these adapting coefficients.

The line Coeff in FIG. 7 shows that, at the time $T_{TPDP}$, the coefficients or operating parameters of the enhancement processing block 42 are poorly adapted to the acoustic environment, but that they become better adapted over time, with the adapted state being represented in FIG. 7 by the line reaching its asymptote.

When data representing the second portion of the trigger phrase is detected, the trigger detection block 38 sends a signal, TDP, to the control block 44. However, again due to processing delays, this signal is actually sent at a time $T_{TPD}$, which is a time Tdd after the user has finished speaking the second portion TP2 of the trigger phrase. When the control block 44 receives this signal, it sends a confirmation signal (Cnfm) to the application processor 32. In other embodiments, no confirmation signal is sent and the application processor is allowed to continue waking uninterrupted.

By this point ($T_{TPD}$), however, the coefficients in the enhancement block have not yet fully converged to the desired coefficients for use in the acoustic environment. Also the AP 32 has not yet fully woken up. But the first command word C1 has already arrived at Bin.

In this embodiment the circular buffer is controlled to continually delay the Bout signal by a delay time Tdb. As illustrated, this is long enough so that the start of C1 is output at a time $T_{C1d}$ that is later than the time $T_W$ at which the AP is adequately awake and the time $T_{ad}$ at which the enhancement processing has adequately converged. At this time (neglecting any enhancement processing delay) the enhancement processing block is thus just starting to output the processed data C1*, followed by later processed control words C2* and C3*, which is processed effectively for use in a speech recognition engine or similar processor. By this time $T_{C1d}$ the application processor 32 has already received confirmation that the second portion of the trigger phrase has been spoken and so, in one embodiment, may transmit the processed data on to the server 14, or at least onto some temporary data buffer associated with interface circuitry for a data bus or communication channel between the processor and the server.

It will be appreciated that, although in this embodiment the data output to the processor 14 is processed for use in speech recognition, there may be no such enhancement block 38 and the data output by the application processor 32 may not have undergone any processing, or any enhancement for use in speech recognition.

It will also be appreciated that, although in the preferred embodiment the application processor 32 transmits the data to a remotely located server for speech recognition processing 14, in some embodiments the speech recognition processes may take place within the device 12, or within the application processor 32.

The data buffer has to be able to store data for a duration of time at least as long as the difference between the duration of the longer of the adaptation time or the AP wake-up delay (including the detection delay Tddp) and the duration of TP2. By activating the application processor 32 when the first portion of the trigger phrase has been detected, rather than waiting for the whole trigger phrase to be detected the buffer size needed is reduced by approximately the duration of TP1 (plus the difference between Tdd and Tddp). Alternatively, for a fixed buffer size, either longer adaptation or wake-up times or more quickly spoken trigger phrases can be accommodated.

It will be appreciated that this is achieved at a cost of introducing a delay Tdb in the output data Sout, but this can be reduced if required over time either by reading data from the buffer 46 at a higher rate than data is written to the buffer 46, or by recognising periods of inter-word silence in the data, and by omitting the data from these periods in the data that is sent to the application processor. In some embodiments the controller may be configured to receive signals indicating when the AP has woken up ($T_W$) and when adaptation is complete ($T_{ad}$) relative to $T_{C1}$: it may then adjust the read pointer at the later of $T_W$ and $T_{ad}$ to immediately start outputting C1 data that will be already have been stored in the buffer rather than wait the full buffer delay until $T_{C1d}$, thus giving less initial delay to the transmitted signal.

There is therefore disclosed a system that allows for accurate processing of received speech data.

The skilled person will recognise that some aspects of the above-described apparatus and methods, for example the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. The word "amplify" can also mean "attenuate", i.e. decrease, as well as increase and vice versa and the word "add" can also mean "subtract", i.e. decrease, as well as increase and vice versa. Any reference numerals or labels in the claims shall not be construed so as to limit their scope.

The invention claimed is:

1. A method of processing received data representing speech comprising the steps of:
    monitoring the received data to detect the presence of data representing a first portion of a trigger phrase in said received data;
    sending, on detection of said data representing the first portion of the trigger phrase, a control signal to activate a speech processing block,
    monitoring the received data to detect the presence of data representing a second portion of the trigger phrase in said received data, and further comprising, if said control signal to activate the speech processing block has previously been sent:
        if the data representing the second portion of the trigger phrase is not detected, sending a deactivation command to deactivate the speech processing block; and
        if said data representing the second portion of the trigger phrase is detected, maintaining the activation of said speech processing block;
    after detecting the data representing the first portion of the trigger phrase:
        supplying a part of the received data to an adaptive speech enhancement block, and
        training the speech enhancement block to derive adapted parameters for the speech enhancement block; and
    if the data representing the first portion of the trigger phrase is detected:
        supplying at least a part of the received data to the speech enhancement block, operating with the adapted parameters, and
        outputting enhanced data from the speech enhancement block.

2. A method as claimed in claim 1 wherein the step of monitoring the received data to detect the presence of data representing the first portion of the trigger phrase and the step of monitoring the received data to detect the presence of data representing the second portion of the trigger phrase occur in parallel.

3. A method as claimed in claim 1 wherein the step of monitoring the received data for the presence of data representing the second portion of the trigger phrase occurs as a result of detecting data representing the first portion of the trigger phrase.

4. A method as claimed in claim 1 wherein, if the data representing the second portion of the trigger phrase is detected, the step of maintaining the activation of the speech processing block comprises sending a confirmation signal to the speech processing block.

5. A method as claimed in claim 1, wherein, if the data representing the second portion of the trigger phrase is detected, the step of maintaining the activation of the speech processing block comprises not sending the deactivation command.

6. A method as claimed in claim 1 further comprising:
    if the data representing the second portion of the trigger phrase is detected, sending speech data to the speech processing block.

7. A method as claimed in claim 6 wherein the speech data is the received data.

8. A method as claimed in claim 1 further comprising:
    if the data representing the first portion of the trigger phrase is detected, sending speech data to the speech processing block.

9. A method as claimed in claim 8, wherein the speech data is the received data.

10. A method as claimed in claim 1 further comprising:
    if the data representing the second portion of the trigger phrase is detected, supplying at least a part of the received data to the speech enhancement block, operating with the adapted parameters, and
    outputting enhanced data from the speech enhancement block.

11. A method as claimed in claim 10 further comprising, storing the received speech data, wherein the at least a part of the received data supplied to the speech enhancement block is the stored data starting from the beginning of the data representing the first portion of the trigger phrase.

12. A method as claimed in claim 10 further comprising, storing the received speech data, wherein
    the at least a part of the received data supplied to the speech enhancement block is the stored data starting from the end of the data representing the first portion of the trigger phrase.

13. A method as claimed in claim 10 further comprising, storing the received data, wherein
    the at least a part of the received data supplied to the speech enhancement block is the stored data starting from the end of the data representing the second portion of the trigger phrase.

14. A method as claimed in claim 10 wherein the at least a part of the received data supplied to the speech enhancement block, is the data received immediately after said detection.

15. A method as claimed in claim 10 wherein the speech data is the enhanced data outputted from the adaptive speech enhancement block.

16. A method as claimed in claim 1 further comprising, storing the received data.

17. A method as claimed in claim 1 wherein the first trigger phrase is the first part of the second trigger phrase.

18. A speech processor, comprising:
    an input, for receiving data representing speech; and
    a speech processing block,
    wherein the speech processor is configured to perform a method of processing received data representing speech comprising the steps of:

monitoring the received data to detect the presence of data representing a first portion of a trigger phrase in said received data;

sending, on detection of said data representing the first portion of the trigger phrase, a control signal to activate the speech processing block, and monitoring the received data to detect the presence of data representing a second portion of the trigger phrase in said received data, and further comprising:

if said control signal to activate the speech processing block has previously been sent:

if the data representing the second portion of the trigger phrase is not detected, sending a deactivation command to deactivate the speech processing block; and if said data representing the second portion of the trigger phrase is detected, maintaining the activation of said speech processing block;

after detecting the data representing the first portion of the trigger phrase:

supplying a part of the received data to an adaptive speech enhancement block, and training the speech enhancement block to derive adapted parameters for the speech enhancement block; and if the data representing the first portion of the trigger phrase is detected:

supplying at least a part of the received data to the speech enhancement block, operating with the adapted parameters, and outputting enhanced data from the speech enhancement block.

19. A speech processor, comprising:

an input, for receiving data representing speech; and an output, for connection to a speech processing block, wherein the speech processor is configured to perform a method of processing received data representing speech comprising the steps of:

monitoring the received data to detect the presence of data representing a first portion of a trigger phrase in said received data;

sending, on detection of said data representing the first portion of the trigger phrase, a control signal to activate the speech processing block, and monitoring the received data to detect the presence of data representing a second portion of the trigger phrase in said received data, and further comprising, if said control signal to activate the speech processing block has previously been sent:

if the data representing the second portion of the trigger phrase is not detected, sending a deactivation command to deactivate the speech processing block; and if said data representing the second portion of the trigger phrase is detected, maintaining the activation of said speech processing block;

after detecting the data representing the first portion of the trigger phrase:

supplying a part of the received data to an adaptive speech enhancement block, and training the speech enhancement block to derive adapted parameters for the speech enhancement block; and if the data representing the first portion of the trigger phrase is detected:

supplying at least a part of the received data to the speech enhancement block, operating with the adapted parameters, and outputting enhanced data from the speech enhancement block.

20. A mobile device, comprising a speech processor, wherein the speech processor is configured to perform a method of processing received data representing speech comprising the steps of:

monitoring the received data to detect the presence of data representing a first portion of a trigger phrase in said received data;

sending, on detection of said data representing the first portion of the trigger phrase, a control signal to activate a speech processing block, and monitoring the received data to detect the presence of data representing a second portion of the trigger phrase in said received data, and further comprising:

if said control signal to activate the speech processing block has previously been sent:

if the data representing the second portion of the trigger phrase is not detected, sending a deactivation command to deactivate the speech processing block; and if said data representing the second portion of the trigger phrase is detected, maintaining the activation of said speech processing block;

after detecting the data representing the first portion of the trigger phrase:

supplying a part of the received data to an adaptive speech enhancement block, and training the speech enhancement block to derive adapted parameters for the speech enhancement block; and if the data representing the first portion of the trigger phrase is detected:

supplying at least a part of the received data to the speech enhancement block, operating with the adapted parameters, and outputting enhanced data from the speech enhancement block.

21. An article of manufacture comprising: a non-transitory computer-readable medium: and computer-executable instructions carried on the computer readable medium, the instructions readable by a processor, the instructions, when read and executed, for causing the processor to:

monitor the received data to detect the presence of data representing a first portion of a trigger phrase in said received data;

send, on detection of said data representing the first portion of the trigger phrase, a control signal to activate a speech processing block, and monitor the received data to detect the presence of data representing a second portion of the trigger phrase in said received data, and if said control signal to activate the speech processing block has previously been sent:

if the data representing the second portion of the trigger phrase is not detected, send a deactivation command to deactivate the speech processing block; and if said data representing the second portion of the trigger phrase is detected, maintain the activation of said speech processing block;

after detecting the data representing the first portion of the trigger phrase:

supply a part of the received data to an adaptive speech enhancement block, and train the speech enhancement block to derive adapted parameters for the speech enhancement block; and if the data representing the first portion of the trigger phrase is detected:

supply at least a part of the received data to the speech enhancement block, operating with the adapted parameters, and output enhanced data from the speech enhancement block.

22. A method of processing speech data comprising the steps of:

activating a speech processing block, on detecting data representing a first portion of a trigger phrase in said speech data;

maintaining said activation of said speech processing block, on subsequently detecting data representing a second portion of said trigger phrase;

de-activating said speech processing block, on subsequently detecting the absence of data representing said second portion of said trigger phrase;

after detecting the data representing the first portion of the trigger phrase:

supplying a part of the received data to an adaptive speech enhancement block, and training the speech enhancement block to derive adapted parameters for the speech enhancement block; and if the data representing the first portion of the trigger phrase is detected:

supplying at least a part of the received data to the speech enhancement block, operating with the adapted parameters, and outputting enhanced data from the speech enhancement block.

* * * * *

UNITED STATES PATENT AND TRADEMARK OFFICE
CERTIFICATE OF CORRECTION

PATENT NO. : 10,102,853 B2
APPLICATION NO. : 15/105755
DATED : October 16, 2018
INVENTOR(S) : Michael Page Page 1 of 1

It is certified that error appears in the above-identified patent and that said Letters Patent is hereby corrected as shown below:

In the Claims

In Column 14, Line 43, in Claim 21, delete "medium: and" and insert -- medium; and --, therefor.

Signed and Sealed this
Second Day of April, 2019

Andrei Iancu
*Director of the United States Patent and Trademark Office*